3,075,247
METHOD FOR PROCESSING BLANKETS
Jacques L. van Huyzen, Altoona, Pa., assignor to Chemo-Vive Processes, Inc., Altoona, Pa., a corporation of Delaware
Filed Apr. 5, 1960, Ser. No. 20,075
10 Claims. (Cl. 18—47.5)

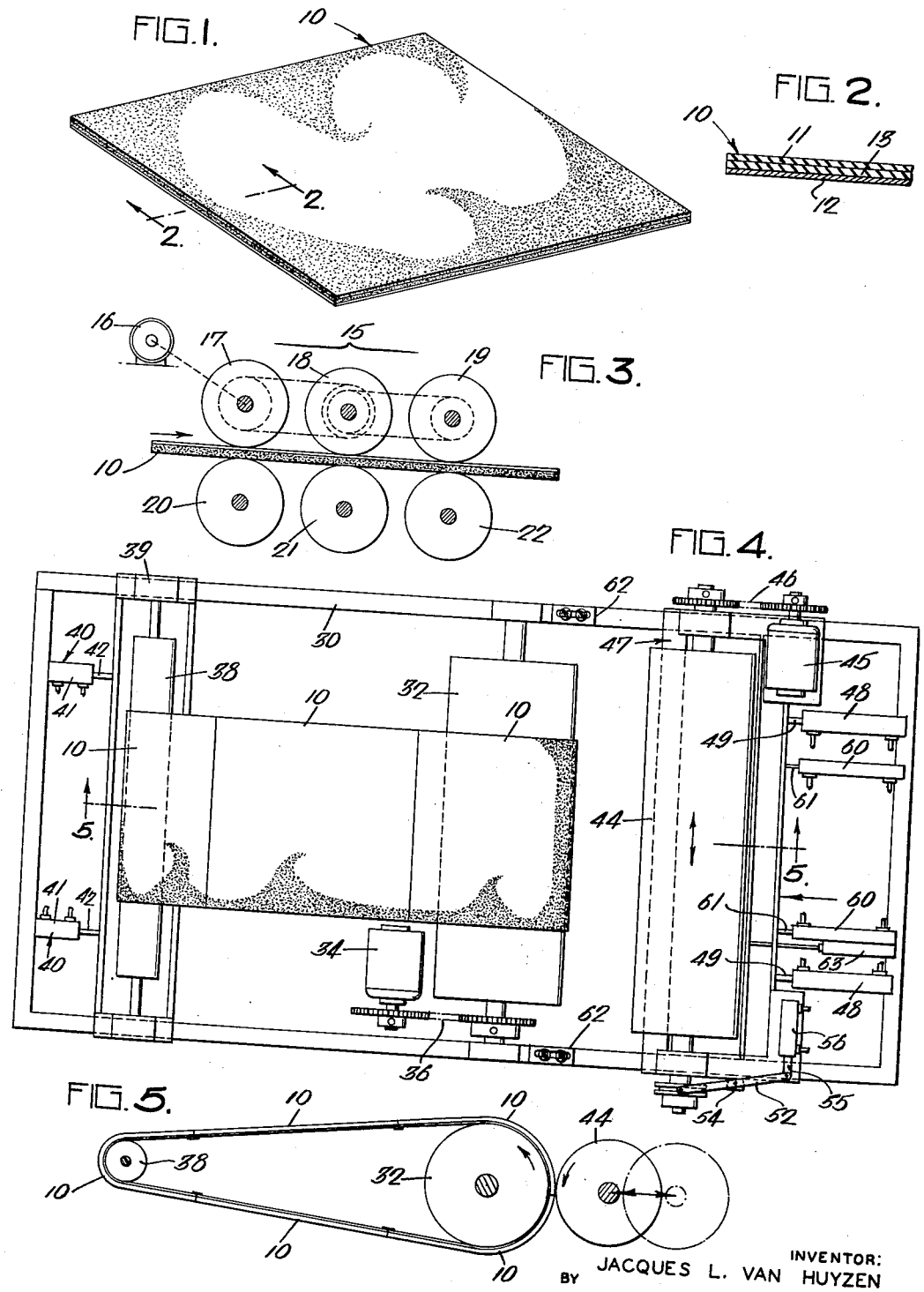

The present invention relates to a method for processing blankets used in lithographic or printing processes. More particularly the invention relates to an improved processing method wherein defective blankets are processed to a condition of uniform thickness and smooth outer surface.

In many printing processes, an offset blanket or the like is used to transfer the desired image to the material being printed. Generally, the blanket is mounted on the outer peripheral surface of a roller, receives the image to be transferred from a metal plate or roll, and transfers the image to the paper, cardboard or other material on which it is desired to print the image. The rubber blanket generally comprises a rubber layer with a smooth outer transfer surface and a cloth backing. For best results in transferring the image from the outer transfer surface of the blanket it is essential that this surface is kept smooth, and that the thickness of the blanket is substantially uniform throughout its length and width.

In some instances, however, the blankets develop low spots or depressions in the outer layer during the printing operation. These depressions in some instances effect proper image transfer, and therefore the blanket is no longer suitable for use. The low spots or depressions may be caused, for example, by paper misfeeding or jamming which tends to depress the rubber surface of the blanket, by accumulation of dirt or other foreign matter which adheres to the smooth rubber surface, by chemicals in the printing ink which contact and etch the rubber surface, and other factors. In the past it has not been possible to rehabilitate such blankets and it has been necessary to replace the blankets, thereby incurring considerable expense.

The present invention provides a method embodying novel features which insure restoration of a blanket to a condition suitable for re-use. According to the present invention, the rubber lay of the blanket is treated with a composition causing it to swell to more than twice its original thickness, and thereafter a predetermined amount of rubber is removed from the outer surface to provide a blanket of uniform thickness having a smooth rubber transfer surface.

The various features and details of the process and construction of the apparatus are more fully set forth and described with reference to the accompanying drawings, in which:

FIG. 1 is a perspective view of a blanket used in offset or lithographic processes;

FIG. 2 is an enlarged sectional view taken along line 2—2 of FIG. 1, showing the components of the blanket;

FIG. 3 is a schematic side elevational view of a rolling mill for compressing and smoothing the blanket;

FIG. 4 is a schematic plan view of an abrasion apparatus made in accordance with the present invention for removing predetermined amounts of the outer layer of the blanket, and FIG. 5 is a sectional view taken along line 5—5 of FIG. 4, showing alternate positions of the abrasion roller.

Referring now to the drawings, FIGS. 1 and 2 show a type of blanket which is adapted to be rehabilitated by the method and apparatus of the present invention. The blanket 10 comprises an outer layer 11 of resilient material, such as rubber, and a cloth backing 12 which preferably is a tightly woven, smooth material. The blanket 10, as illustrated in FIG. 2, may comprise two layers of resilient material, wherein the intermediate layer 13 may be made of a harder, or less resilient, composition than the outer layer 11. The total thickness of the blanket is generally in the order of 0.06 inch, and the individual layers 11, 12 and 13 are approximately 0.02 inch thick.

The method of rehabilitating blankets in accordance with the present invention consists generally of three operations; a preliminary smoothing operation, a swelling and reducing or abrasion operation, wherein the rubber is caused to swell and in which a predetermined amount of rubber is removed from the blanket, and a final compressing or smoothing operation.

The blanket 10 is prepared for the preliminary compressing and smoothing operation by first scrubbing the cloth backing 12 and the outer transfer surface of the layer 11 with a suitable detergent and water solution to remove grease, dirt, loose ink, and other foreign matter. The blanket is then rinsed and hung to dry. After the blanket is dried completely, a solution of cellulose may be applied to the cloth backing in order to fill in small imperfections and also to even out the cloth. The cellulose solution is preferably one composed of approximately 2 parts methyl-cellulose and 98 parts water. The solution is prepared by stirring one ounce of methyl-cellulose in 20 fluid ounces of boiling water. This solution, after standing for approximately 30 minutes, is then mixed with about 60 fluid ounces of cold water. In this manner the cellulose will dissolve completely in the cold water without lumps. An example of a methyl-cellulose having the desired characteristics, which is commercially available on the market is a methyl-cellulose supplied by the Dow Chemical Company.

The next step in the rehabilitation process or method of the present invention is preparing the blanket for the initial or preliminary smoothing, or compressing operation. To this end a first composition is applied to the cloth side of the blanket to permit the cloth to be evenly compressed and straightened out in the operation, and also to the rubber transfer surface of the blanket in order to soften the rubber slightly. This composition is preferably one consisting of 33 parts benzol, 16 parts chloroform, 5 parts carbon-tetracholoride, 3 parts emulsifying detergent, and 43 parts water. When the blanket is sufficiently dried, it is subjected to compression in order to smooth out any projecting portions of the cloth surface, and also to smooth the rubber surface thereof.

Thereafter, a second composition is applied to the rubber surface of the blanket causing it to swell. The blanket is then aged to permit the proper swelling action to take place, as a result of which the rubber layer is swollen to more than twice its original thickness in preparation for the abrasion operation. This composition preferably consists of 31 parts sulphurated hydrocarbon distillate, 28 parts benzol, 28 parts chloroform, 12 parts ammonia, and 1 part pine needle oil. In this condition the blanket is now ready for the reducing or abrasion operation wherein a predetermined layer of rubber is removed from the outer surface of the blanket.

Thereafter, the first composition is applied to the rubber surface of the blanket, which results in slight swelling thereof. The blanket is then subjected to a final compressing and polishing operation to provide a layer of uniform thickness, having a smooth rubber surface. During the compressing operation the grain is reduced and a superior printing surface is provided.

In accordance with the present invention, apparatus for carrying out some of the method steps outlined above are provided. For example, the preliminary smoothing operation and the final compressing and polishing operation may be carried out on a rolling mill 15, shown in FIG. 3. The mill may comprise a plurality of rollers suitably interconnected by means of a chain drive and to a motor source 16 for actuation of the rollers simultaneously. In the present instance, three drive rollers, 17, 18 and 19 are provided which are spaced apart and adapted to rotate in a counter-clockwise direction with respect to FIG. 3. Each of the rollers (from left to right with reference to FIG. 3) may if desired be driven at a successively faster rate to effect a slipping action between the rollers 18 and 19 and the blanket which produces a slight amount of smoothing of the outer layers of the blanket. The drive rollers 17, 18 and 19 are provided with complementary co-acting idler rollers 20, 21 and 22, respectively, which are spaced from the drive rollers to provide a small clearance therebetween. The drive rollers 17, 18 and 19 are spaced from their respective idler rollers 20, 21 and 22 to provide progressively smaller clearances from left to right as viewed in FIG. 3; that is, the distance between the peripheral edges of the rollers 17 and 20 is slightly greater than the distance between the peripheral edges of the rollers 18 and 21, which in turn is greater than the peripheral spacing between rollers 19 and 22. In this manner, as the blanket is passed through the mill from left to right, as viewed in FIG. 3, the desired pressing and rolling action takes place.

Roller 17 may be suitably connected to a heating unit to provide a range of heat between 150° F. and 250° F. Rollers 18 and 19, on the other hand, may be maintained at a temperature of approximately 35° F. by suitable refrigeration means. Accordingly, during the preliminary rolling of the blanket, wherein the cloth surface thereof is in contact with the drive rollers, an ironing effect on the cloth is achieved. During the final compressing and polishing operation where the rubber surface of the blanket is in contact with the drive rollers as the blanket passes through the mill, a hardening of the rubber layer is achieved by the contrast of heat and cold.

In accordance with the present invention, the reducing operation may be carried out on an abrasion apparatus as illustrated in FIGS. 4 and 5. The apparatus comprises a supporting frame 30, and a main blanket roll 32, rotatably supported on the frame 30, which may be driven by a motor 34 connected to the main blanket roll 32 by means of a chain drive 36. An idler roll 38 is rotatably mounted in a support 39 which is movable lengthwise of the frame 30, so that the roll 38 may be moved longitudinally with respect to the main blanket roll 32. A plurality of blankets may be connected end-to-end, as shown in FIG. 5, by means of tapes to form a continuous belt. The blankets are spaced between the rolls 38 and 32, so that their upper, or rubber, layer faces outwardly, and are maintained taut therebetween by means of a pair of air-actuated tensioning mechanisms 40 disposed adjacent outer ends of the roller 38. Each of the tensioning mechanisms comprises a cylinder 41 mounted at one end of the frame 30 and a piston 42 slidably mounted in the cylinder 41 and connected to the idler roll support 39. The pistons 42 are actuatable lengthwise of the frame 30 to regulate the position of the roller 38 with respect to the roller 32. In this way the blankets may be secured end to end between the rollers 32 and 38 and the pistons 42 actuated to move the idler roller 38 away from the roller 32 to provide a predetermined tension in the loop of blankets.

A cylinder 44 having abrasive means on its outer peripheral surface is positioned adjacent the main blanket roll 32 and rotated by means of a motor 45 connected to the roll, for example, by means of a chain drive 46. As shown in FIG. 4, the abrasion cylinder 44 is mounted on a support 47 movable lengthwise of the frame 30 and may be rotated in a direction opposite to that of the main blanket roll 32. Means are provided for actuating the abrasion roller 44 into engagement with the endless loop of blankets on the blanket roll 32. For example, a pair of fluid cylinders 48, 48 mounted on the frame 30 and having their pistons 49, 49 connected to the support frame 47 may be provided to move the frame 47 back and forth with respect to the blanket roll 32 as desired. The roller 44 may also be actuated axially of the blanket roller 32 by means of a lever arm 52 pivotally connected to the frame at 54 and at its outer ends to the roller 44 and the piston 55 of a fluid cylinder 56. Reciprocation of the piston 55 of the fluid cylinder 56 effects reciprocation of the roller 44 in a direction axially of the main blanket roller 32.

Means are provided to actuate the abrasion roller 44 lengthwise of the frame 30 to engage the blankets on the roll 32 and remove a predetermined layer of rubber from their outer surface. To this end a pair of fluid cylinders 60, 60 are supported on the frame 30 having their pistons 61, 61 connected to the abrasion roller support 47. A pair of adjustable stop members 62 are mounted on the frame 60 as shown, which may be selectively positioned on the frame 30 to engage with the abrasion roller support 47. When the desired amount has been removed from the outer surface of the blankets, the rate of feed of the abrasion roller 44 may be selectively slowed down during the abrasion operation for greater precision by means of a check unit 63 which transfers actuation of the roller 44 from the fluid cylinder 48 to the cylinders 60, 60 at a predetermined position.

In the operation of the apparatus described, the blankets are moved in a counter-clockwise direction with respect to FIG. 5 about the main blanket roller 32 with the outer surface thereof facing outwardly. The abrasion cylinder 44 which is oscillated axially of the blanket roller 32 by the piston 55 of the fluid cylinder 56 is moved toward the blanket roller 32 by means of the pistons 49. When the abrasion roller 44 has been moved to a predetermined position, as determined by the check unit 63, actuation of the roller 44 is transferred to the fluid cylinders 60, which move the roller 44 at a slower rate for the finish cut. The termination of the grinding sequence is determined by engagement of the abrasion roller support 47 with the stop member 62.

While a particular form of the present invention has been illustrated and described herein, it is to be understood that changes and modifications may be incorporated therein within the scope of the following claims.

I claim:

1. In the method of processing a blanket consisting of a layer of resilient material having an outer transfer surface and a cloth backing, the steps comprising; applying a swelling agent to the outer transfer layer to cause the resilient layer at its outer transfer surface to swell over the entire surface area of the blanket, removing a predetermined amount of the resilient layer to provide a blanket of uniform thickness having a smooth transfer surface, and compressing the blanket to a predetermined uniform thickness.

2. The method of claim 1, wherein the resilient layer is swollen to more than twice its original thickness.

3. In the method of processing blankets consisting of a rubber transfer layer having an outer transfer surface and a cloth backing, the steps comprising applying a composition to the entire rubber layer at its outer transfer surface to swell the same, aging the blanket for a predetermined length of time to permit the swelling action to take place, removing a predetermined amount of the rubber surface to provide a blanket of uniform thickness having a smooth transfer surface, and compressing the blanket to a predetermined uniform thickness.

4. The method of claim 3 wherein the composition consists of 31 parts sulphurated hydrocarbon distillate, 28 parts benzol, 28 parts chloroform, 12 parts ammonia, and 1 part pine needle oil.

5. In the method of processing blankets consisting of a rubber layer having an outer transfer surface and a cloth backing, the steps comprising; applying a first composition to the outer transfer surface of the blanket to swell the same to more than twice its original thickness, removing a predetermined amount of the rubber from said surface to provide a smooth rubber surface of uniform thickness, applying a second composition to clean the rubber surface and cause slight softening of the rubber, and compressing the blanket to a predetermined uniform thickness.

6. The method of claim 5 wherein the first composition consists of 33 parts benzol, 16 parts chloroform, 5 parts carbon tetrachloride, 3 parts emulsifying detergent, and 44 parts water, and wherein the second composition consists of 31 parts sulphurated hydrocarbon distillate, 28 parts benzol, 28 parts chloroform, 12 parts ammonia, and 1 part pine needle oil.

7. In the method of processing blankets consisting of a rubber layer having an outer transfer surface and a cloth backing, the steps comprising applying a first composition to the outer transfer surface of the rubber and the cloth backing to clean the same and cause slight softening of the rubber portion of the blanket, compressing the blanket to straighten out the cloth backing, applying a second composition to the outer transfer surface of said blanket, aging the blanket to permit swelling of the outer transfer surface thereof to more than twice its original thickness, removing a predetermined amount of the rubber from the outer transfer surface to provide a smooth rubber of uniform thickness, applying said first composition to the outer transfer surface of the blanket to soften the same slightly, and compressing the blanket to a predetermined uniform thickness.

8. In the method of processing blankets consisting of a rubber layer having an outer transfer surface and a cloth backing, the steps comprising cleaning the cloth backing and rubber transfer surface with a suitable detergent, applying a solution to smooth the cloth and fill in small imperfections, applying a swelling agent to the outer transfer surface to cause said surface to swell to more than twice its original thickness, removing a predetermined amount of the rubber from said outer transfer surface to provide a smooth rubber surface of uniform thickness and compressing the blanket to a predetermined uniform thickness.

9. The method of claim 8 wherein the solution comprises about 2 parts methyl cellulose and 98 parts water.

10. In the method of processing blankets consisting of a rubber transfer surface and a cloth backing, the steps comprising cleaning the rubber surface and cloth backing with a suitable detergent, drying the blanket, applying a solution to the cloth surface to smooth the cloth and fill in small imperfections, applying a first composition to both sides of the blanket to clean the same and cause slight swelling of the rubber surface, compressing the blanket to smooth the cloth surface and rubber transfer surface, applying a second composition to the rubber surface of said blanket to swell the rubber, aging the blanket to permit the swelling action to expand the rubber to more than twice its original thickness, removing a predetermined portion of the rubber to provide a smooth rubber surface of uniform thickness, applying said first composition to the rubber surface, and compressing the blanket to a predetermined finished thickness.

References Cited in the file of this patent

UNITED STATES PATENTS

| | | |
|---|---|---|
| 2,170,919 | Thener | Aug. 29, 1939 |
| 2,305,859 | Freund | Dec. 22, 1942 |
| 2,420,284 | Carswell | May 6, 1947 |
| 2,762,433 | Russell | Sept. 11, 1956 |
| 2,787,323 | Van Antwerpen et al. | Apr. 2, 1957 |
| 2,856,635 | Gerson et al. | Oct. 21, 1958 |
| 2,946,094 | Kawasaki | July 26, 1960 |

UNITED STATES PATENT OFFICE

CERTIFICATE OF CORRECTION

Patent No. 3,075,247                        January 29, 1963

Jacques L. van Huyzen

It is hereby certified that error appears in the above numbered patent requiring correction and that the said Letters Patent should read as corrected below.

Column 1, line 45, for "lay" read -- layer --; column 5, line 29, after "rubber" insert -- surface --.

Signed and sealed this 20th day of August 1963.

(SEAL)
Attest:

ERNEST W. SWIDER
Attesting Officer

DAVID L. LADD
Commissioner of Patents